United States Patent
Earl et al.

(10) Patent No.: US 8,143,180 B2
(45) Date of Patent: Mar. 27, 2012

(54) HONEYCOMB CEMENT WITH CERAMIC-FORMING CRYSTALLIZABLE GLASS AND METHOD THEREFOR

(75) Inventors: David A Earl, Flower Mound, TX (US); Tonia Havewala Fletcher, Big Flats, NY (US); Robert John Paisley, Corning, NY (US)

(73) Assignee: Corning Incorporated, Corning, NY (US)

( * ) Notice: Subject to any disclaimer, the term of this patent is extended or adjusted under 35 U.S.C. 154(b) by 723 days.

(21) Appl. No.: 12/255,959

(22) Filed: Oct. 22, 2008

(65) Prior Publication Data

US 2009/0142544 A1  Jun. 4, 2009

Related U.S. Application Data

(60) Provisional application No. 61/004,891, filed on Nov. 30, 2007.

(51) Int. Cl.
*C04B 35/195* (2006.01)
*C03C 8/14* (2006.01)

(52) U.S. Cl. ............ 501/17; 501/15; 501/119; 501/128; 501/9

(58) Field of Classification Search ............ 501/10, 501/15, 17, 9, 119, 128
See application file for complete search history.

(56) References Cited

U.S. PATENT DOCUMENTS

| | | | |
|---|---|---|---|
| 3,942,966 A | 3/1976 | Kroyer et al. | 3/22 |
| 4,451,516 A | 5/1984 | Kato | 428/116 |
| 4,568,402 A | 2/1986 | Ogawa et al. | |
| 4,595,662 A | 6/1986 | Mochida et al. | 8/24 |
| 4,840,827 A | 6/1989 | Mizutani et al. | 3/12 |
| 5,024,975 A * | 6/1991 | Hartmann | 501/65 |
| 5,145,540 A * | 9/1992 | Foley et al. | 156/89.17 |
| 5,188,779 A | 2/1993 | Horikawa et al. | 41/61 |
| 5,258,205 A | 11/1993 | Wu | 427/393.6 |
| 5,534,470 A * | 7/1996 | Andrus et al. | 501/32 |
| 5,629,067 A | 5/1997 | Kotani et al. | |
| 5,962,351 A * | 10/1999 | Chyung et al. | 501/7 |
| 6,231,986 B1 * | 5/2001 | Sugimoto et al. | 428/426 |
| 6,710,014 B2 | 3/2004 | Domesle et al. | 21/4 |
| 6,726,977 B2 | 4/2004 | Kumazawa et al. | 3/12 |
| 6,953,756 B2 * | 10/2005 | Kawai et al. | 501/9 |
| 2003/0162883 A1 | 8/2003 | Fabian et al. | |
| 2003/0228968 A1 * | 12/2003 | Usui et al. | 501/32 |
| 2005/0159308 A1 | 7/2005 | Bliss et al. | 21/4 |
| 2005/0255288 A1 | 11/2005 | Noguchi et al. | 428/116 |
| 2010/0252497 A1 * | 10/2010 | Ellison et al. | 210/500.1 |

FOREIGN PATENT DOCUMENTS

| | | | | |
|---|---|---|---|---|
| EP | 0 677 498 | | 10/1995 | |
| EP | 1 106 589 | | 6/2001 | 35/195 |
| JP | 62252004 | * | 11/1987 | |
| JP | 1025122 | * | 1/1998 | |
| WO | 2008/039284 | | 4/2008 | |

* cited by examiner

*Primary Examiner* — Karl Group
(74) *Attorney, Agent, or Firm* — Joseph M. Homa; Matthew J. Mason

(57) ABSTRACT

Disclosed are cements for ceramic honeycomb bodies. Such cements can be applied to a fired ceramic honeycomb body then fired, or can be applied to an unfired (green) honeycomb body and co-fired with the green honeycomb body. The cement can also be used to plug one or more cells in a honeycomb body, wherein the cement can be inserted into a green or a fired ceramic honeycomb body, then fired. Also disclosed are methods of manufacturing a ceramic honeycomb article with the cement.

10 Claims, 3 Drawing Sheets

HONEYCOMB CEMENT WITH CERAMIC-FORMING CRYSTALLIZABLE GLASS AND METHOD THEREFOR

RELATED APPLICATIONS

This application claims the benefit of U.S. Provisional Application No. 61/004,891, filed Nov. 30, 2007, entitled "Honeycomb Cement with Ceramic-Forming Crystallizable Glass and Method Therefor."

BACKGROUND

The present invention relates generally to cements suitable for use with ceramic honeycomb bodies, such as for forming an outer layer on the outer periphery of the honeycomb body, or for forming plugs in the honeycomb body.

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of gaseous emissions from automobile engine systems. Honeycomb structures have been implemented. An outer layer or "artificial skin" or "after-applied skin" can be applied to the outer periphery of honeycomb bodies after the honeycomb bodies have been extruded. Such skin or layer is not co-extruded with the honeycomb body, but is applied after the honeycomb body has been extruded.

Defects such as cracking, separation, and delamination of the skin have been observed after catalyzation of honeycomb structures having a skin formed from known dryer-cured coatings which require only low temperatures to dry or cure, but which can begin to soften and weaken when exposed above 900° C. subsequent to drying or curing.

SUMMARY

In one aspect, a cement for a honeycomb body is disclosed herein comprising crystallizing glass frit. The crystallizing glass frit is mixed with a plurality of inorganic components comprising ceramic-forming components. The cement mixture preferably further comprises a solvent, such as water, and an organic binder, such as a cellulosic binder like cellulose ether or methylcellulose, polyvinyl alcohol, polyethylene oxide, and the like. The honeycomb body can be green, e.g. comprising ceramic-forming precursors, or fired ceramic material. The green honeycomb body and an outer layer of the cement mixture applied thereon can be simultaneously fired sufficient to simultaneously form ceramic in the outer layer and in the honeycomb body. The honeycomb body comprising ceramic and an outer layer of the cement mixture applied thereon can be simultaneously fired sufficient to form ceramic in the outer layer.

In another aspect, a method of manufacturing a honeycomb structure is disclosed herein, the method comprising: applying a cement mixture to an outer surface of a honeycomb body to form an applied outer layer of the cement mixture on the outer honeycomb body, wherein the cement mixture comprises a plurality of inorganic components comprising ceramic-forming components, and ceramic-forming crystallizable glass particles; then exposing the honeycomb body with the applied outer layer to a first firing environment for a time and at one or more temperatures sufficient to cause a first ceramic material having a first crystalline phase to form from the glass particles.

In another aspect, a honeycomb structure is disclosed herein comprising a ceramic honeycomb body having a glass-bonded ceramic outer layer.

In another aspect, a method of manufacturing a ceramic honeycomb article is disclosed herein, the method including the steps of providing a green ceramic-forming matrix of intersecting ceramic walls defining a plurality of cells; applying an outer ceramic-forming layer to an outer surface of the matrix, the outer layer including a ceramic-forming crystallizing glass frit; and simultaneously firing the matrix and the outer layer to form the ceramic honeycomb article.

The cement mixture disclosed herein is preferably heated to more than 1000° C., more preferably greater than 1200° C., even more preferably greater than 1300° C., and in some embodiments greater than 1380° C., and in other embodiments greater than or equal to 1400° C.

Additional features and advantages of the present invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of the specification. The drawings illustrate various embodiments and aspects of the invention, and together with the description serve to explain the principles and operations of the invention.

DETAILED DESCRIPTION

Figure 1:
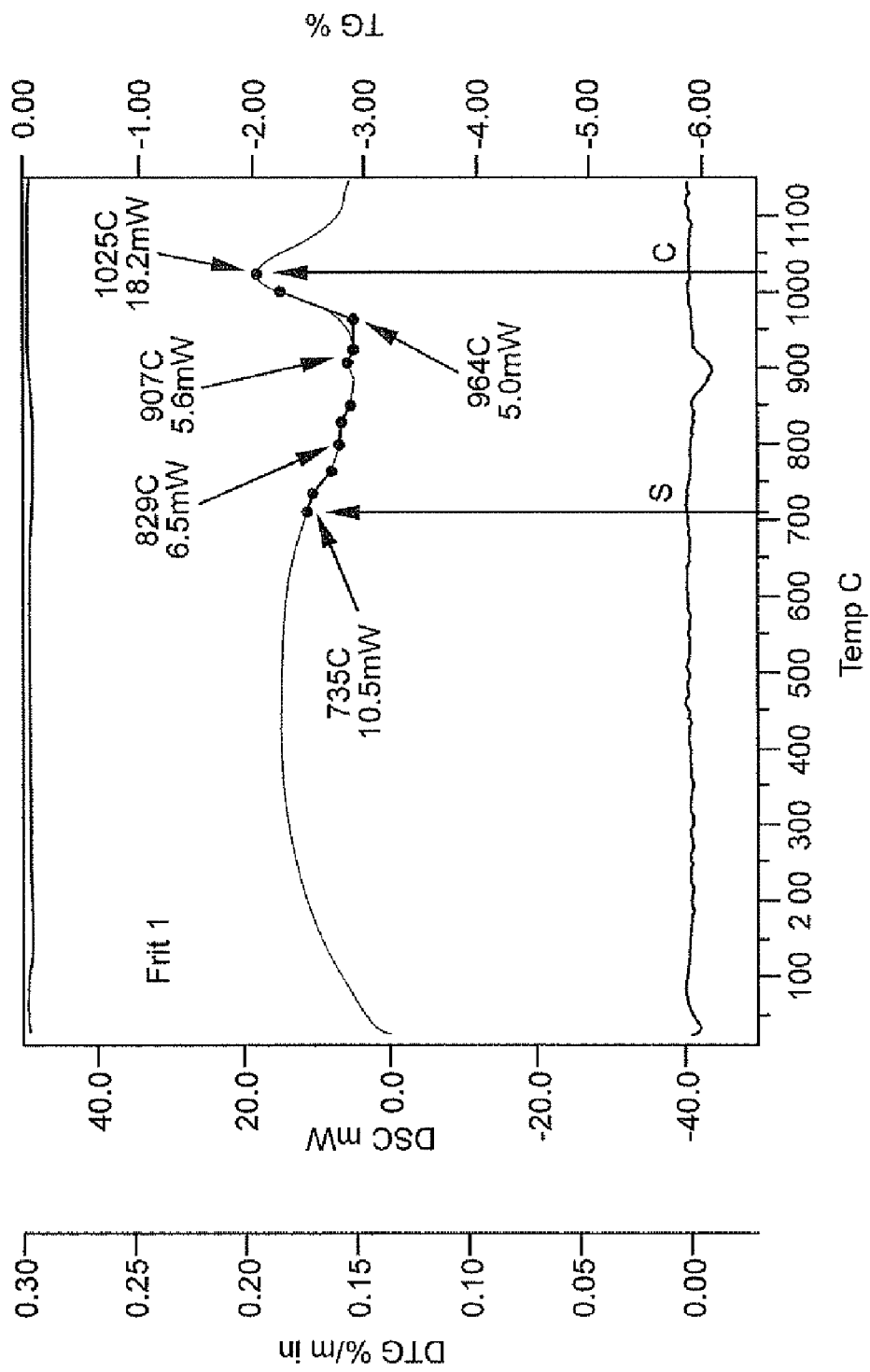
FIG. 1 shows differential scanning calorimetry (DSC) plots illustrating exemplary sintering and crystallization temperatures for glass frit #1 used in cement mixtures as disclosed herein.

Reference will now be made in detail to the present embodiments of the invention, examples and aspects of which are illustrated in the accompanying drawings.

As used herein, the term "ceramic precursor components" includes inorganic materials such as ceramic-forming crystallizing glass frits and batch materials (e.g., MgO, $Al_2O_3$, $SiO_2$ and the like) at least some of which form a desired ceramic phase, such as cordierite, upon firing, as well as binders, solvents, lubricants, and the like.

As used herein, the term "sintering initiation temperature" refers to the temperature at which a ceramic-forming crystallizing glass frit begins to sinter.

As used herein, the term "crystallization temperature" refers to the temperature at which at least one ceramic phase forms from, i.e., crystallizes out of, a ceramic-forming crystallizing glass frit.

In one aspect, a cement mixture is disclosed herein for a honeycomb body comprised of a first ceramic material having a first primary crystalline phase, the cement mixture comprising: a plurality of inorganic components comprising ceramic-forming components capable of forming a second ceramic material having a second primary crystalline phase upon firing of the cement mixture; and ceramic-forming crystallizable glass particles capable of forming the second ceramic material upon firing of the cement mixture. In some embodiments, the plurality of inorganic components can comprise a ceramic component. The ceramic component can comprise the second primary crystalline phase. In some embodiments, the ceramic component is comprised of cordierite. In other embodiments, the plurality of inorganic components includes no ceramic component. In some embodiments, the plurality of inorganic components does not include cordierite. Preferably, the first and second crystalline phases are the same, i.e. of the same type of ceramic. For example, in some embodiments, the first and second crystalline phases are both cordierite. In some embodiments, the first crystalline phase is cordierite. In some embodiments, the ceramic-forming components and the crystallizable glass particles, when fired, form a cement having the same crystalline phase as the honeycomb body. In some embodiments, the ceramic-forming components comprise oxide sources; in some of these embodiments, the ceramic-forming components comprise cordierite-forming components; in some of these embodiments, the ceramic-forming components comprise oxide sources of Mg, Al, and Si; in some of these embodiments, the ceramic-forming components comprise MgO, $Al_2O_3$, and $SiO_2$. In some embodiments, the glass particles are present in the cement mixture in about 2% to about 8% by weight. In some embodiments, the cement mixture is further comprised of an alkaline earth metal oxide. In some embodiments, the cement mixture contains less than 15 wt %, and in other embodiments less than 10 wt %, alkaline earth metal oxide; in some embodiments, the cement mixture contains less than 5 wt % alkaline earth metal oxide. In some embodiments, the cement mixture is further comprised of an alkali metal oxide. In some embodiments, the cement mixture contains less than 2 wt %, and in other embodiments less than 1 wt %, alkali metal oxide. In some embodiments, the glass particles are comprised of an oxide composition, in percent by weight, of 15% to 25% MgO, 18% to 30% $Al_2O_3$, and 45% to 65% $SiO_2$.

In another aspect, a cement mixture is disclosed herein suitable for use with a green honeycomb body which is capable forming into a ceramic honeycomb body comprised of a first ceramic material having a first crystalline phase upon firing of the green honeycomb body, wherein the green honeycomb body is comprised of ceramic-forming components. The cement mixture comprises: a plurality of inorganic components comprising ceramic-forming components capable of forming into a second ceramic material having a second crystalline phase upon firing of the cement mixture; and ceramic-forming crystallizable glass particles capable of forming a second ceramic material having a second crystalline phase upon firing of the cement mixture.

In some embodiments, the green honeycomb body is comprised of cordierite-forming components. In some embodiments, the ceramic-forming components are cordierite-forming components. In some embodiments, the plurality of inorganic components comprises a ceramic component. In some embodiments, the ceramic component comprises the second primary crystalline phase. In some embodiments, the ceramic component is comprised of cordierite. In some embodiments, the plurality of inorganic components includes no ceramic component. In some embodiments, the plurality of inorganic components does not include cordierite. In some embodiments, the ceramic-forming components and the crystallizable glass particles, when fired, form a cement mixture having the same crystalline phase as the honeycomb body. In some embodiments, the ceramic-forming components comprise oxide sources. In some embodiments, the ceramic-forming components comprise cordierite-forming components. In some embodiments, the ceramic-forming components comprise oxide sources of Mg, Al, and Si. In some embodiments, the ceramic-forming components comprise MgO, $Al_2O_3$, and $SiO_2$. In some embodiments, the glass particles are present in the cement mixture in about 2% to about 8% by weight. In some embodiments, the cement mixture is further comprised of an alkaline earth metal oxide. In some embodiments, the cement mixture contains less than 5 wt % alkaline earth metal oxide. In some embodiments, the cement mixture is further comprised of an alkali metal oxide. In some embodiments, the glass particles are comprised of an oxide composition, in percent by weight, of 15% to 25% MgO, 18% to 30% $Al_2O_3$, and 45% to 65% $SiO_2$.

In another aspect, a method of manufacturing a honeycomb structure is disclosed herein, the method comprising: applying a cement mixture to an outer surface of a honeycomb body to form a coated honeycomb body comprised of the honeycomb body with an outer layer of the cement mixture, the cement mixture comprising: a plurality of inorganic components comprising ceramic-forming components; and ceramic-forming crystallizable glass particles; then, exposing the coated honeycomb body to a first firing environment for a time and at one or more temperatures sufficient to cause a first ceramic material having a first crystalline phase to form from the glass particles.

In some embodiments, during the exposing step, the ceramic-forming crystallizable glass particles sinter, then the first ceramic material crystallizes from the sintered glass particles. In some of these embodiments, the first ceramic material crystallizes from the sintered glass particles when the temperature in the first firing environment is more than 200° C. greater than a temperature at which the glass particles begin to sinter. In some embodiments, the ceramic-forming crystallizable glass particles sinter when the temperature in the first firing environment is greater than about 700° C.

In some embodiments, the ceramic-forming crystallizable glass particles sinter when the first temperature, or the temperature of the outer layer, is in the range of about 700 to 950° C. In some embodiments, the ceramic-forming crystallizable glass particles sinter when the first temperature, or the outer layer, is in the range of about 700 to 920° C. In some embodiments, the first ceramic material crystallizes from the sintered glass particles when the first temperature is in the range of about 920 to 1050° C.

In some embodiments, the method further comprises, after exposing the coated honeycomb body to the first firing environment, exposing the coated honeycomb body to a second firing environment for a second time and at a second temperature sufficient to cause a second ceramic material having a second crystalline phase to form from the ceramic-forming components, thereby forming a honeycomb structure comprising a ceramic outer layer.

In some embodiments, the second ceramic material forms from the ceramic-forming components when the second temperature is in the range of about 1350 to 1430° C. In some embodiments, the second ceramic material forms from the ceramic-forming components when the second temperature is in the range of about 1380 to 1420° C.

In some embodiments, the first and second crystalline phases are the same; in some of these embodiments, the first and second crystalline phases are cordierite.

In some embodiments, the honeycomb body is comprised of a plurality of ceramic-forming components, and the exposing the coated honeycomb body to the second firing environment causes a third ceramic material having a third crystalline phase to form from the plurality of ceramic-forming components; in some of these embodiments, the first, second, and third crystalline phases are cordierite.

In some embodiments, the honeycomb body is a porous honeycomb body comprised of a third ceramic material having a third crystalline phase; in some of these embodiments, the first, second, and third crystalline phases are cordierite.

In some embodiments, the method further comprises, prior to applying the cement mixture, removing an outer portion of the honeycomb body to form an exposed portion of the honeycomb body, then applying the cement mixture to the exposed portion.

In some embodiments, the method further comprises, before the applying step, extruding a matrix of intersecting walls defining a plurality of cells to form the honeycomb body.

In some embodiments, the method further comprises exposing the honeycomb body to a firing environment prior to the applying of the cement mixture. In some embodiments, the method further comprises, prior to the applying of the cement mixture, plugging at least some of the cells of the honeycomb body; in some of these embodiments, the method further comprises, after the plugging and prior to the applying of the cement mixture, exposing the honeycomb body to a firing environment.

In another aspect, a cement mixture for a honeycomb body is disclosed herein, the cement mixture comprising: a plurality of inorganic components selected from the group consisting of one or more ceramic-forming components, one or more ceramic components, and combinations thereof; and crystallizable glass particles which when fired are capable of forming a crystalline phase of a ceramic material. In some embodiments, at least one of the one or more ceramic components has the same crystalline phase as the ceramic material formed when the crystallizable glass particles are fired, i.e. when the cement mixture is fired. In some embodiments, the crystallizable glass particles comprise a plurality of ceramic-forming components; in some embodiments, the plurality of ceramic-forming components comprises oxide sources. In some embodiments, the plurality of ceramic-forming components comprises cordierite-forming components; in some of these embodiments, the plurality of ceramic-forming components comprises oxide sources of Mg, Al, and Si; in some of these embodiments, the plurality of ceramic-forming components comprises $MgO$, $Al_2O_3$, and $SiO_2$. In some embodiments, the one or more ceramic components comprise cordierite. In some embodiments, the one or more ceramic-forming components comprise cordierite-forming components. In some embodiments, the glass particles are present in the cement mixture in about 2% to about 8% by weight. In some embodiments, the cement mixture is further comprised of an alkaline earth metal oxide. In some embodiments, the cement mixture contains less than 5 wt % alkaline earth metal oxide. In some embodiments, the cement mixture is further comprised of an alkali metal oxide. In some embodiments, the glass particles are comprised of an oxide composition, in percent by weight, of 15% to 25% $MgO$, 18% to 30% $Al_2O_3$, and 45% to 65% $SiO_2$.

In another aspect, a cement mixture for a honeycomb article is disclosed herein, the cement mixture comprising: a plurality of ceramic precursor components wherein at least one of the ceramic precursor components comprises ceramic-forming crystallizable glass particles. In some embodiments, the glass particles are comprised of a cordierite precursor material. In some embodiments, the glass particles are comprised of $MgO$, $Al_2O_3$, and $SiO_2$. In some embodiments, the cement mixture is further comprised of a ceramic (i.e. already fired) component. In some embodiments, the fired ceramic component is cordierite. In some embodiments, the glass particles have a sintering initiation temperature of greater than about 700° C. and a crystallization temperature of more than about 200° C. greater than the sintering initiation temperature. In some embodiments, the glass particles are present in the cement mixture in about 2% to about 8% by weight. In some embodiments, the cement mixture is further comprised of an alkaline earth metal oxide. In some embodiments, the cement mixture contains less than 5 wt % alkaline earth metal oxide. In some embodiments, the cement mixture is further comprised of an alkali metal oxide. In some embodiments, the glass particles are comprised of an oxide composition, in percent by weight, of 15% to 25% $MgO$, 18% to 30% $Al_2O_3$, and 45% to 65% $SiO_2$.

In yet another aspect, a honeycomb structure is disclosed herein comprising a green honeycomb matrix of intersecting walls that define a plurality of cells, and an outer layer disposed on an outer surface of the matrix, wherein the outer layer is comprised of the cement mixture disclosed herein. Preferably, the green honeycomb matrix is an extruded structure, and the outer layer is not co-extruded with the matrix.

In still another aspect, a honeycomb structure is disclosed herein comprising a ceramic honeycomb matrix of intersecting walls that define a plurality of cells, wherein the cement mixture disclosed herein is disposed in at least a portion of the plurality of cells.

In another aspect, a honeycomb structure is disclosed herein comprising a ceramic honeycomb matrix and an outer layer, the outer layer comprising glass-bonded ceramic formed from the cement mixture disclosed herein, wherein the outer layer is bonded to the honeycomb matrix. Preferably, at least an inner portion of the honeycomb matrix contains no glass.

In another aspect, a honeycomb structure is disclosed herein comprising a ceramic honeycomb matrix and a plurality of plugs, the plugs comprising glass-bonded ceramic formed from the cement mixture disclosed herein, wherein the plugs are bonded to the honeycomb matrix. Preferably, at least an inner portion of the honeycomb matrix contains no glass.

In another aspect, a honeycomb structure is disclosed herein comprising a ceramic honeycomb matrix and an outer layer disposed on the matrix, the outer layer comprising glass-bonded ceramic. Preferably, at least an inner portion of the honeycomb matrix containing no glass.

In another aspect, a honeycomb structure is disclosed herein comprising a ceramic honeycomb matrix and a glass-bonded ceramic layer disposed on the matrix. Preferably, at least an inner portion of the honeycomb matrix contains no glass.

In another aspect, a honeycomb structure is disclosed herein comprising a ceramic honeycomb matrix having a plurality of walls defining a plurality of cells, and a glass-bonded ceramic plug disposed in at least one cell, wherein at least an inner portion of the honeycomb matrix contains no glass.

Figure 2:
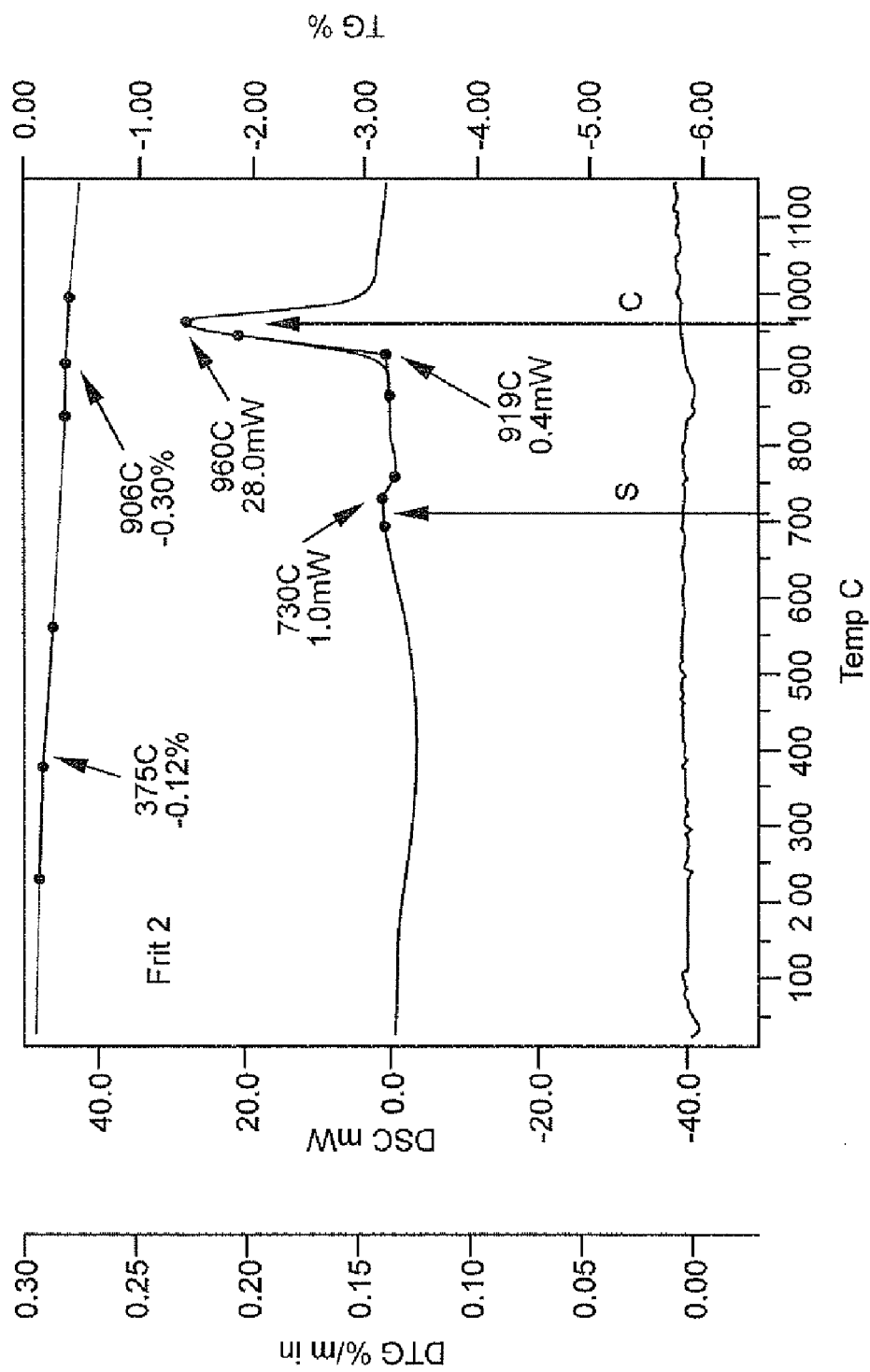
FIG. 2 shows differential scanning calorimetry (DSC) plots illustrating exemplary sintering and crystallization temperatures for glass frit #2 used in cement mixtures as disclosed herein.

As disclosed herein, at least one of the second plurality of ceramic precursor components (in addition to inorganic ceramic-forming components such as talc, clay, silica, alumina, aluminum hydroxide, an organic binder, and a solvent), is a ceramic-forming crystallizing glass frit. We have found that glass frits aid in sintering and bonding to the walls of the honeycomb matrix, crystallize desired phases during firing, and provide an improved cement (such as an outer layer or skin or coating, or plug). In some embodiments, the glass frit may comprise a cordierite precursor material. In other embodiments, the glass frit comprises MgO, $Al_2O_3$, and $SiO_2$ as exemplified in Table 1. The glass frit should have a sintering initiation temperature of greater than about 700° C. and a crystallization temperature of more than about 200° C. greater than the sintering initiation temperature, as generally indicated in FIGS. 1-2 by lines labeled "S" and "C", respectively. In some embodiments, the glass frit may comprise an alkaline earth metal oxide, wherein the alkaline earth metal oxide is selected from the group consisting of MgO, CaO, and combinations thereof. In another aspect, the glass frit may comprise an alkali metal oxide, wherein the alkali metal oxide is present in an amount, in percent by weight, of 0.01% to 2.0% and wherein the alkali metal oxide is selected from the group consisting of $Na_2O$, $K_2O$, and combinations thereof.

TABLE 1

Glass Frit Composition Range

|  | Weight % | Mole % |
|---|---|---|
| MgO | 15-25 | 23-36 |
| $Al_2O_3$ | 18-30 | 10-16 |
| $SiO_2$ | 45-65 | 44-61 |
| Alkaline Earth Oxides | 0-5 | 0-5 |

In some embodiments, the outer layer comprising a ceramic-forming crystallizing glass frit further comprises a fired ceramic material, wherein the fired ceramic material is cordierite. In some embodiments, the glass frit has a crystallization temperature about 200° C. to 300° C. greater than the sintering initiation temperature. In some embodiments, the glass frit is present in the outer layer in about 2% to about 8% by weight.

Another method of manufacturing a ceramic honeycomb article is disclosed herein, the method including the steps of providing a green ceramic-forming matrix of intersecting ceramic walls defining a plurality of cells; applying a ceramic-forming outer layer to an outer surface of the matrix; and simultaneously firing the matrix and the outer layer to form the ceramic honeycomb article. The green ceramic-forming matrix is an extruded structure, whereas the ceramic-forming outer layer is not co-extruded with the matrix.

In some embodiments, the ceramic-forming outer layer, which is comprised of ceramic precursor components, includes a ceramic-forming crystallizing glass frit as described above. A fired ceramic phase is formed in the outer layer from the ceramic precursor components upon firing.

Further, a matrix, after firing, comprises a first ceramic primary phase, and the outer layer, after firing, comprises a second ceramic primary phase, each of which phases may be the same, and wherein the first ceramic primary phase is cordierite.

In some embodiments, the cement disclosed herein, after firing, comprises MgO, $Al_2O_3$, and $SiO_2$. In some embodiments, the outer layer, after firing, comprises an oxide composition, in percent by weight, of 13% to 15% MgO, 34% to 36% $Al_2O_3$, and 50% to 52% $SiO_2$. In some embodiments, the cement, after firing, exhibits a modulus of rupture, as measured on a solid rod of circular cross section, of greater than 1000 pounds per square inch (psi), preferably greater than 1100 psi, more preferably greater than 1500 psi, still more preferably greater than 2000 psi and in some embodiments even greater than 2500 psi. The higher flexural strength is expected to provide for improved thermal shock resistance.

The invention will be further clarified by the following examples.

Talc, clay, silica, alumina, aluminum hydroxide, ceramic-forming crystallizing glass frit (Frit 1 or Frit 2), and, optionally, cordierite powder were combined with methocellulose binder (1 wt %, superadded to the inorganics) and water (45 superadded wt %, superadded to the inorganics) to produce a glass frit-containing cement in the form of a paste. Frit 1 comprised an oxide composition, in percent by weight, of 0.53% $Na_2O$, 0.12% $K_2O$, 14.8% MgO, 6.99% CaO, 1.26% $B_2O_3$, 18.10% $Al_2O_3$, and 54.10% $SiO_2$. Frit 2 comprised an oxide composition, in percent by weight, of 1.13% $Na_2O$, 0.20% $K_2O$, 20.2% MgO, 5.50% CaO, 1.05% $B_2O_3$, 23.50% $Al_2O_3$, and 44.90% $SiO_2$. The paste was applied to an unfired (green) diesel filter honeycomb matrix as a coating thereon and co-fired with the matrix to approximately 1400° C., with temperature-holds generally between 200 and 300° C. and at about 1000° C. Table 2 lists formulations for six examples of glass frit-containing cements (Examples 2-7) and one example of a cement that did not contain glass frit, as well as the post-firing oxide compositions, fired crystalline phases, and flexural strength values (as modulus of rupture, in psi) for each corresponding fired cement compositions.

Table 2 indicates that addition of ceramic-forming crystallizing glass frits increases the strength of fired ceramic coatings or plugs formed from the cement disclosed herein. Because the cements were fired to approximately 1400° C., and dilatometer tests up to 1000° C. revealed no slumping or viscous flow, the cements properties were stable to at least 1000° C. As illustrated by the Examples in Table 2, the primary or major phase of the ceramic formed after firing of the cement was cordierite, and minor phases included spinel and/or sapphirine.

Figure 3:
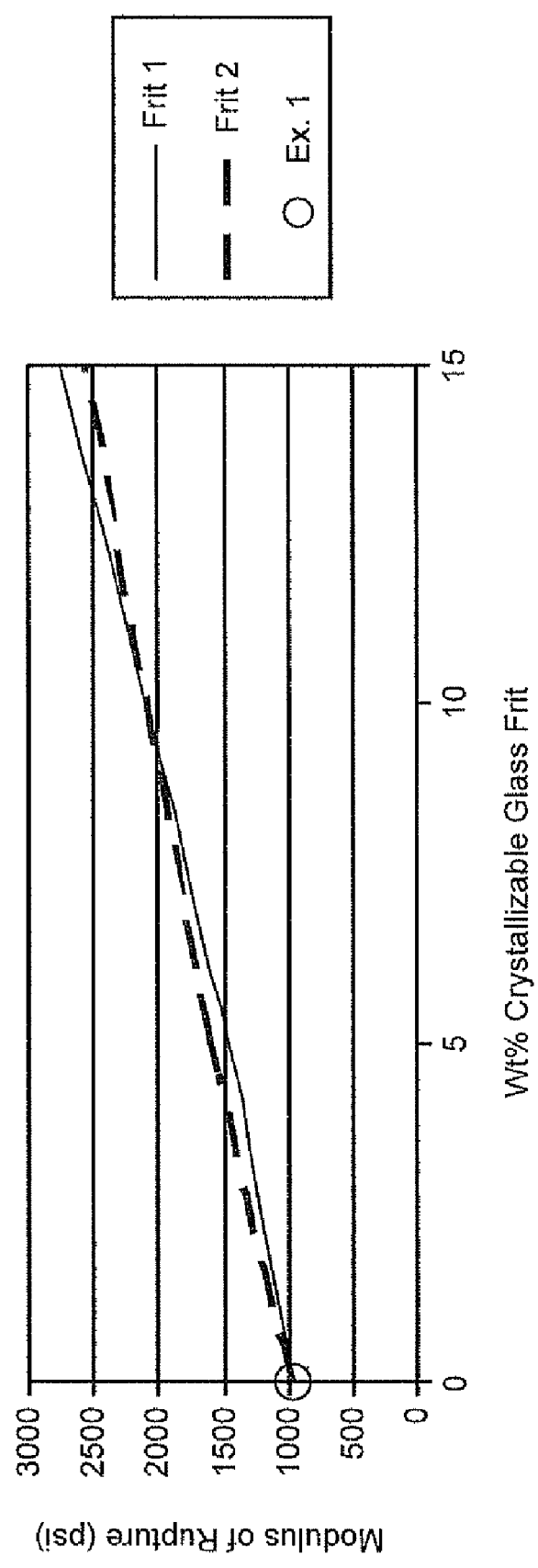
FIG. 3 shows flexural strength of various cements versus frit content.

FIG. 3 shows the flexural strength of a coating formed from glass frit-containing cements of Examples 2, 3, 4, and 5 from Table 2, along with the 0% glass frit Example 1, versus frit content.

TABLE 2

|  | 1 | 2 | 3 | 4 | 5 | 6 | 7 |
|---|---|---|---|---|---|---|---|
| [1]Batch Materials (weight %) | | | | | | | |
| Talc | 40.6 | 37.0 | 32.0 | 35.9 | 28.6 | 18.8 | 16.8 |
| Clay | 11.7 | 11.7 | 11.6 | 11.7 | 11.7 | 6.8 | 6.9 |
| Silica | 14.4 | 14.2 | 11.3 | 15.6 | 15.4 | 6.7 | 9.1 |
| Alumina | 14.7 | 13.5 | 11.6 | 13.2 | 10.7 | 6.8 | 6.3 |
| Aluminum Hydroxide | 18.6 | 18.6 | 18.5 | 18.6 | 18.6 | 10.9 | 10.9 |

TABLE 2-continued

|  | 1 | 2 | 3 | 4 | 5 | 6 | 7 |
|---|---|---|---|---|---|---|---|
| Cordierite Powder | — | — | — | — | — | 35.0 | 35.0 |
| Glass Frit 1 | — | 5.0 | 15.0 | — | — | 15.0 | — |
| Glass Frit 2 | — | — | — | 5.0 | 15.0 | — | 15.0 |
| Total: | 100 | 100 | 100 | 100 | 100 | 100 | 100 |
| Oxide Composition (weight %) | | | | | | | |
| MgO | 13-15 | 13-15 | 13-15 | 13-15 | 13-15 | 13-15 | 13-15 |
| CaO | — | — | — | — | — | — | — |
| $Al_2O_3$ | 34-36 | 34-36 | 34-36 | 34-36 | 34-36 | 34-36 | 34-36 |
| $SiO_2$ | 50-52 | 50-52 | 50-52 | 50-52 | 50-52 | 50-52 | 50-52 |
| Other | 1-2 | 1-2 | 1-2 | 1-2 | 1-2 | 1-2 | 1-2 |
| Crystalline Phases in Fired Coating | | | | | | | |
| Major Phase | Cordierite | Cordierite | Cordierite | Cordierite | Cordierite | Cordierite | Cordierite |
| Minor Phases | Spinel, Sapphirine | Spinel, Sapphirine | Spinel, Sapphirine | Spinel, Sapphirine | Spinel, Sapphirine | Spinel, Sapphirine | Spinel, Sapphirine |
| Modulus of Rupture (psi): | 961 | 1468 | 2733 | 1597 | 2550 | 1732 | 2339 |

[1]Superadditions of Binder (1 wt %) and water (45 wt %) were included in each formulation The glass particles are comprised of an oxide composition, in percent by weight, of about 15% to 25% MgO, about 18% to 30% $Al_2O_3$, and about 45% to 65% $SiO_2$. Preferably, the glass particles contain no more than 5 mol % of alkaline earth oxides not found in the desired ceramic phase(s). Preferably, the glass particles are comprised of compositions providing at least 50 mol % of the desired ceramic phase(s), i.e. not counting the mol % contributed by other materials added to the cement mixture. Table 3 lists the compositions of crystallizable glass particles, i.e. Frits #1 and #2, utilized in Table 2.

TABLE 3

|  | Glass Frit 1 (wt %) | Glass Frit 2 (wt %) |
|---|---|---|
| $Na_2O$ | 0.53 | 1.13 |
| $K_2O$ | 0.12 | 0.20 |
| MgO | 14.80 | 20.20 |
| CaO | 6.99 | 5.50 |
| $B_2O_3$ | 1.26 | 1.05 |
| $Al_2O_3$ | 18.10 | 23.50 |
| $SiO_2$ | 54.10 | 44.90 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

The invention claimed is:

1. A cement mixture for a honeycomb body, the cement mixture comprising:
   a plurality of inorganic components selected from the group consisting of one or more ceramic-forming components, one or more ceramic components, and combinations thereof; and
   about 2% to about 8% by weight of crystallizable glass particles, said crystallizable glass particles comprising MgO, $Al_2O_3$, and $SiO_2$, which when fired are capable of forming a crystalline phase of a ceramic material.

2. The cement mixture of claim 1 wherein at least one of the one or more ceramic components has the same crystalline phase as the ceramic material formed when the crystallizable glass particles are fired.

3. The cement mixture of claim 1 wherein the crystallizable glass particles comprise a plurality of ceramic-forming components.

4. The cement mixture of claim 3 wherein the plurality of ceramic-forming components comprises cordierite-forming components.

5. The cement mixture of claim 1 wherein the glass particles have a sintering initiation temperature of greater than about 700° C. and a crystallization temperature of more than about 200° C. greater than the sintering initiation temperature.

6. The cement mixture of claim 1 wherein the glass particles are comprised of an oxide composition, in percent by weight, of 15% to 25% MgO, 18% to 30% $Al_2O_3$, and 45% to 65% $SiO_2$.

7. The cement mixture of claim 1, wherein the crystallizable glass particles further comprise at least one alkali metal oxide.

8. The cement mixture of claim 7, wherein the at least one alkali metal oxide is selected from the group consisting of $Na_2O$, $K_2O$, and combinations thereof.

9. The cement mixture of claim 7, wherein the alkali metal oxide is present in an amount, in percent by weight, of 0.01% to 2.0%.

10. The cement mixture of claim 1, wherein the crystallizable glass particles further comprise CaO.

* * * * *